Sept. 30, 1930.  C. JONES ET AL  1,777,090
TRAILER HITCH
Filed Feb. 16, 1929   2 Sheets-Sheet 2
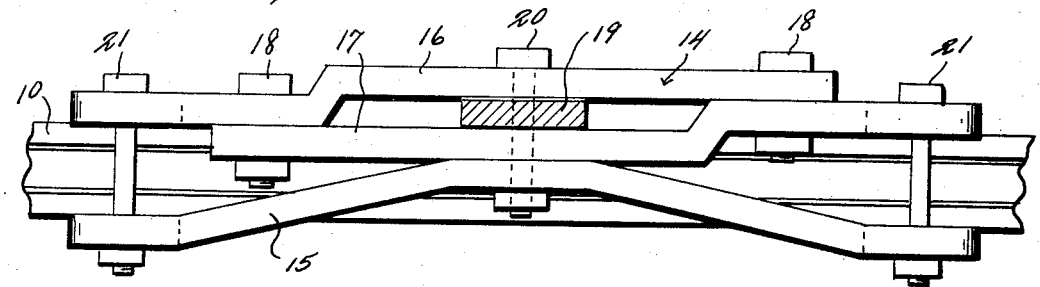
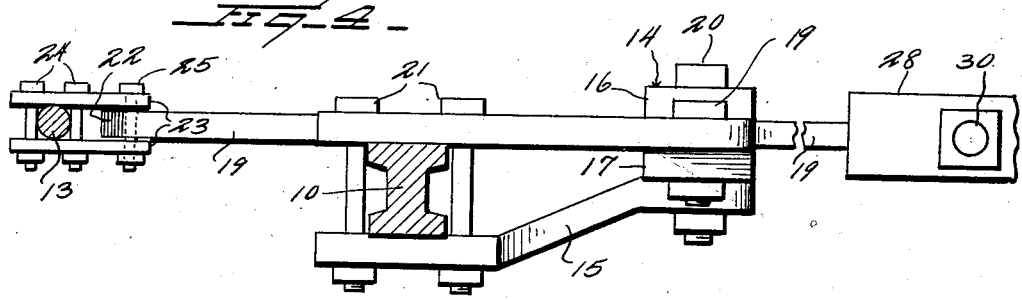
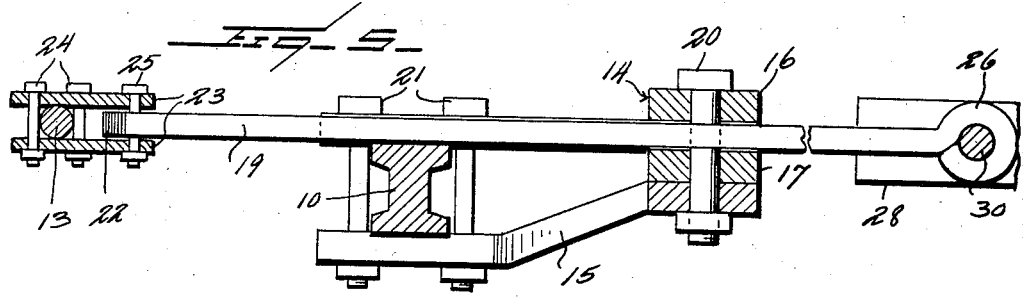
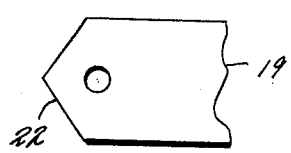
Inventors
C. Jones
J. Jones
By Watson E. Coleman
Attorney Patented Sept. 30, 1930

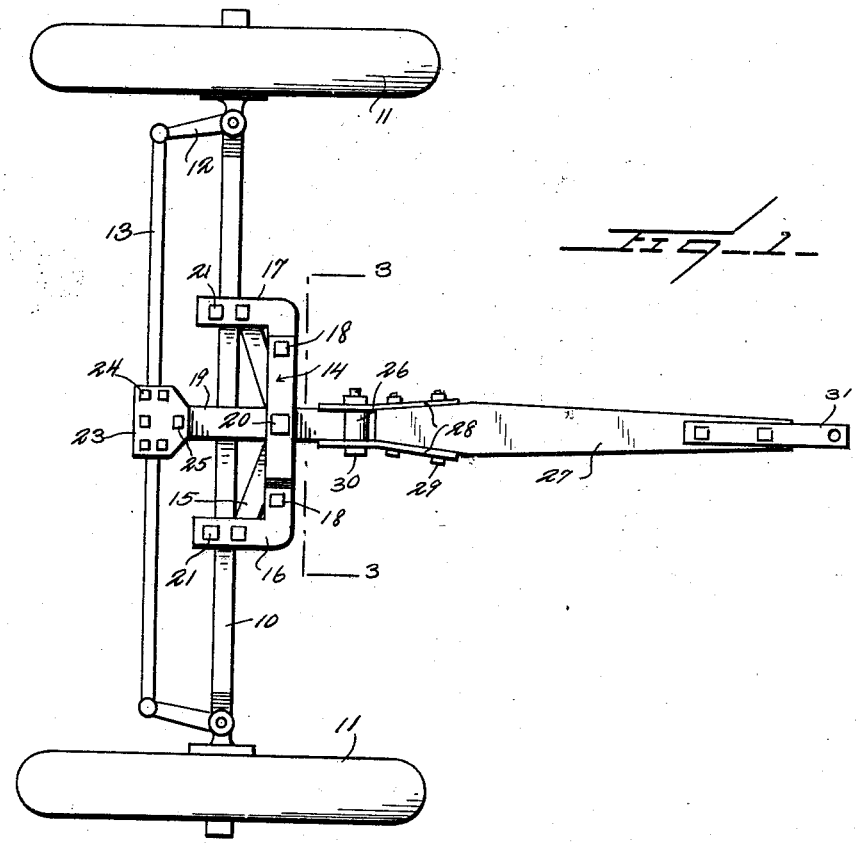

1,777,090

UNITED STATES PATENT OFFICE

CHESTER JONES AND JESSE JONES, OF HASKELL, TEXAS

TRAILER HITCH

Application filed February 16, 1929. Serial No. 340,393.

This invention relates to trailer hitches, though it is not limited to use with trailer specifically as it may be used with any drawn vehicle and the general object of the invention is to provide a hitch of this character which is particularly designed to be used by farmers in connecting up an ordinary automobile with a vehicle, the vehicle having dirigible steering wheels and a steering bar.

One of the objects of the invention is to provide a construction of this character which may be attached to the towed vehicle so as to be permanent and in continuous use if necessary, and which is constructed so that the steering wheels will not have too much lost motion.

A further object is to provide a device of this character which is so connected to the towed vehicle that when the car is stopped, it will not shift or kick out of place.

Another object is to provide a trailer hitch so constructed that tongues of different lengths may be used and interchanged.

Other objects will appear in the course of the following description.

Our invention is illustrated in the accompanying drawings, wherein:—

Figure 1 is a top plan view of a trailer hitch in applied position upon the front axle of a towed car;

Figure 2 is an under side plan view of the trailer hitch;

Figure 3 is a sectional view on the line 3—3 of Figure 1;

Figure 4 is a longitudinal elevation of the hitch, the axle being in section;

Figure 5 is a like view to Figure 4 but with the guide tongue supporting plates in section;

Figure 6 is an end view of the guide tongue.

Referring to these drawings, it will be seen that we have shown our device as applied to a towed car having the usual axle 10, the steering wheels 11, the knuckles 12 and the steering rod 13 connecting the knuckles. Our trailer hitch includes a U-shaped member 14 and an approximately U-shaped iron 15. The member 14 is formed of two sections 16 and 17, each section being approximately L-shaped in form and one leg of the L-shaped section being deflected vertically in the opposite direction to the like leg of the other section so that when these sections are placed together as shown in Figure 3 and bolted by the bolts 18, a space will be left between the irons 16 and 17 between which the guiding bar 19 is disposed.

This guiding bar is pivotally held in place by the bolt 20 which extends down through the sections 16 and 17 and the approximately U-shaped iron 15. This iron 15 is angularly bent and the two arms as they may be called of the iron extend downward and rearward from the central point as shown most clearly in Figure 4 and then extend beneath the axle 10. This iron 15 constitutes not only means for engaging the axle but constitutes a brace. The extremities of the irons 16 and 17 and of the iron 15 are disposed respectively above and below the axle 10 as illustrated in Figure 4 and held in place upon the axle by the clamping bolts 21 as shown in Figure 4. Thus the axle is firmly gripped between the ends of the member 14 and the ends of the member 15 and the guiding tongue 19 is supported for swinging movement in a horizontal plane just above the axle. The rear end of the guiding tongue is angular in form as at 22. Engageable with the steering rod 13 are upper and lower plates 23, these plates being alike, which are clamped upon the steering rod 13 by means of the bolts 24. These plates are both pivoted to the inserted end 22 of the guiding tongue 19 by means of the bolt 25.

The guiding tongue 19 at its forward end is bent to form an eye 26. Associated with the guiding tongue 19 by means of the eye 26 is a draft tongue 27. This at its rear end has a width approximately the same as the guiding tongue 19 and is preferably made of wood. Disposed on each side of the rear end of the tongue 27 are the strap irons 28 which are held in place by means of the bolt 29. These strap irons are apertured for the passage of a bolt 30 which passes through the strap irons and through the bead or roll 26.

The irons 28 it will be noted from Figure 1 extend beyond the bolt 30 and engage on each side of the steering tongue 19, thus taking considerable strain off the hinge formed by the bolt 30 and the bead 26 and particularly where the tongue 27 is shifted laterally. This construction, however, permits the tongue 27 to move up and down upon the bolt 30 without transmitting this movement to the steering tongue 19. The forward end of the tongue 27 is engaged with the towing vehicle by means of the laterally disposed irons 31, these irons extending beyond the tongue and being apertured for the passage of a clevis or for any suitable connection to the towed vehicle. Tongues of different lengths may be provided for insertion between the irons 28 and to be bolted thereto by bolts 29.

It will be seen that with this construction, the hitch is connected to the axle by the approximately U-shaped brace 15 in addition to the irons 16 and 17 and this brace connected by means of the king bolt 20 to the tongue and extending laterally and rearwardly of the trailer axle, thus forming a brace, which in stopping the car, will not kick or swing downward so that any rearward thrust is directed equally both above and below the axle. It will likewise be seen that the guiding tongue 19 is held very firmly between the irons 16 and 17 so that there will be no tendency for it to turn or twist when strain is placed upon it. With this construction the trailer hitch may be readily applied to the axle of the car or removed therefrom and it is of such construction that it may be kept permanently upon the car and merely the tongue 27 be removed which is readily done by removing the bolt 30.

Our construction further provides for the ready removal and replacement of one tongue by tongues of different lengths. In order to prevent any loose joints which would cause the wheels to have too much lost motion, which is a defect very common in trailer hitches, we have provided the straight guide tongue 19 which extends from the tongue coupling formed by the bolt 30 through the two U-shaped members 14 and 15 back to the steering rod and all joints except the hinge joint at the steering rod end of the guiding bar are done away with, thus eliminating all lost motion. This causes the trailer to track or trail perfectly. This hitch is particularly strong by virtue of the fact that it has two upper axle engaging irons 16 and 17 which are offset to leave space for the guiding bar 19 and because of the fact that these bars 16 and 17 are overlapped upon each other, the strength of this particular member 14 is doubled.

By reason of the fact that the steering rod 13 is clamped between two plates having a relatively large area of contact with the steering bar, these plates being clamped by means of bolts, there can be no possible slippage of the steering bar within the plates.

While we have illustrated details of construction and arrangements of parts, we do not wish to be limited to them as it is obvious that many minor changes may be made without departing from the spirit of the invention as defined in the appended claims.

We claim:—

1. A trailer hitch comprising a guide tongue, a main tongue detachably pivoted to the guide tongue for movement in a vertical plane, the rearward end of the guide tongue having means whereby it may be clamped on a steering rod, and a support for the guide tongue comprising an upper approximately U-shaped member formed of two overlapping sections offset from each other to accommodate the tongue between them, the sections being bolted to each other, a brace disposed below the upper member, the ends of the brace and U-shaped member being adapted to be clamped on an axle, a king bolt passing through the tongue, both of the sections and through the middle of the brace, the middle of the brace being elevated with reference to the ends thereof to engage against the under side of the upper member.

2. In a trailer hitch, a guide tongue, a main tongue detachably pivoted to the guide tongue for movement in a vertical plane, the rear end of the guide tongue having means whereby it may be clamped on a steering rod and a support for the guide tongue comprising a lower, aproximately V-shaped brace and an upper approximately U-shaped member, the brace and member being adapted at their ends to rest respectively below and above an axle and bolts passing through the ends of the brace and through said U-shaped member and clamping to the axle, the U-shaped member being formed of two sections offset from each other to provide spaced portions between which the guide tongue is disposed, the brace having its middle elevated into contact with the under face of the U-shaped member, and a king bolt passing through said U-shaped member, the guide tongue and said brace.

In testimony whereof we hereunto affix our signatures.

CHESTER JONES.
JESSE JONES.